(12) United States Patent
Moon et al.

(10) Patent No.: US 10,120,223 B2
(45) Date of Patent: Nov. 6, 2018

(54) LIQUID CRYSTAL DISPLAY DEVICE

(71) Applicant: LG Display Co., Ltd., Seoul (KR)

(72) Inventors: JeYoung Moon, Chungcheongnam-do (KR); SangHo Han, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 169 days.

(21) Appl. No.: 15/363,159

(22) Filed: Nov. 29, 2016

(65) Prior Publication Data
US 2017/0192288 A1    Jul. 6, 2017

(30) Foreign Application Priority Data

Dec. 30, 2015 (KR) ........................ 10-2015-0189483

(51) Int. Cl.
*G02F 1/1333* (2006.01)
*F21V 8/00* (2006.01)

(52) U.S. Cl.
CPC ..... *G02F 1/133308* (2013.01); *G02B 6/0055* (2013.01); *G02F 1/13338* (2013.01); *G02F 2001/133317* (2013.01); *G02F 2001/133331* (2013.01)

(58) Field of Classification Search
CPC .......... G02F 1/133308; G02F 1/13338; G02B 6/0055
See application file for complete search history.

(56) References Cited

U.S. PATENT DOCUMENTS

| | | | |
|---|---|---|---|
| 2009/0045305 A1* | 2/2009 | Oshima | F16M 11/10 248/205.1 |
| 2013/0061700 A1* | 3/2013 | Mitsui | G06F 1/1615 74/105 |

\* cited by examiner

*Primary Examiner* — Joseph L Williams
(74) *Attorney, Agent, or Firm* — Morgan, Lewis & Bockius LLP (57) ABSTRACT

Disclosed is an LCD device. The LCD device includes an upright-type case member including a supporting surface, a backlight unit attached on the supporting surface, and a liquid crystal display panel directly attached on the backlight unit. The upright-type case member is bent from one edge of the supporting surface and protrudes to a front surface of the liquid crystal display panel. Since the liquid crystal display panel is directly attached on the backlight unit, a separate element for enabling the liquid crystal display panel to be stably disposed on the backlight unit is not needed, and thus, a thickness of the LCD device does not increase.

11 Claims, 7 Drawing Sheets

LIQUID CRYSTAL DISPLAY DEVICE

CROSS-REFERENCE TO RELATED APPLICATIONS

This application claims the benefit of the Korean Patent Application No. 10-2015-0189483 filed on Dec. 30, 2015, which is hereby incorporated by reference as if fully set forth herein.

BACKGROUND

Field of the Invention

The present invention relates to a liquid crystal display (LCD) device.

Discussion of the Related Art

LCD devices display an image by using thin film transistors (TFTs) as switching elements. The LCD devices are widely used as display devices for notebook computers, tablet computers, smartphones, portable display devices, and portable information devices, in addition to televisions or monitors. Since the LCD devices cannot self-emit light, the LCD devices display an image by using light emitted from a backlight unit which is disposed under a liquid crystal display panel.

In this case, a guide panel is disposed between the backlight unit and the liquid crystal panel. The guide panel enables the liquid crystal panel to be stably disposed on the backlight unit. However, the guide panel is disposed to have a certain thickness between the backlight unit and the liquid crystal panel, causing an increase in thickness of an LCD device. For this reason, in a related art LCD device, there is a limitation in reducing a thickness, and consequently, improvement of an aesthetic appearance is limited.

SUMMARY

Accordingly, the present invention is directed to provide an LCD device that substantially obviates one or more problems due to limitations and disadvantages of the related art.

An object of the present invention is to provide a display device that has a thin thickness and an enhanced aesthetic appearance.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display (LCD) device comprises an upright-type case member including a supporting surface, a backlight unit attached on the supporting surface, and a liquid crystal display panel directly attached on the backlight unit, wherein the upright-type case member is bent from one edge of the supporting surface and protrudes to a front surface of the liquid crystal display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of an LCD device according to the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 1:
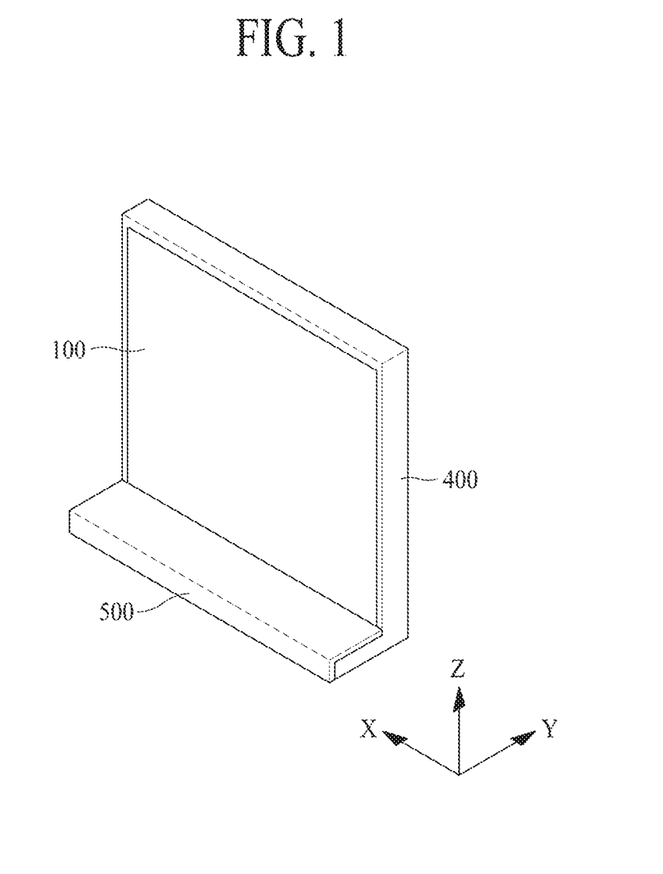
FIG. 1 is a perspective view illustrating an LCD device according to an embodiment of the present invention.
Figure 2:
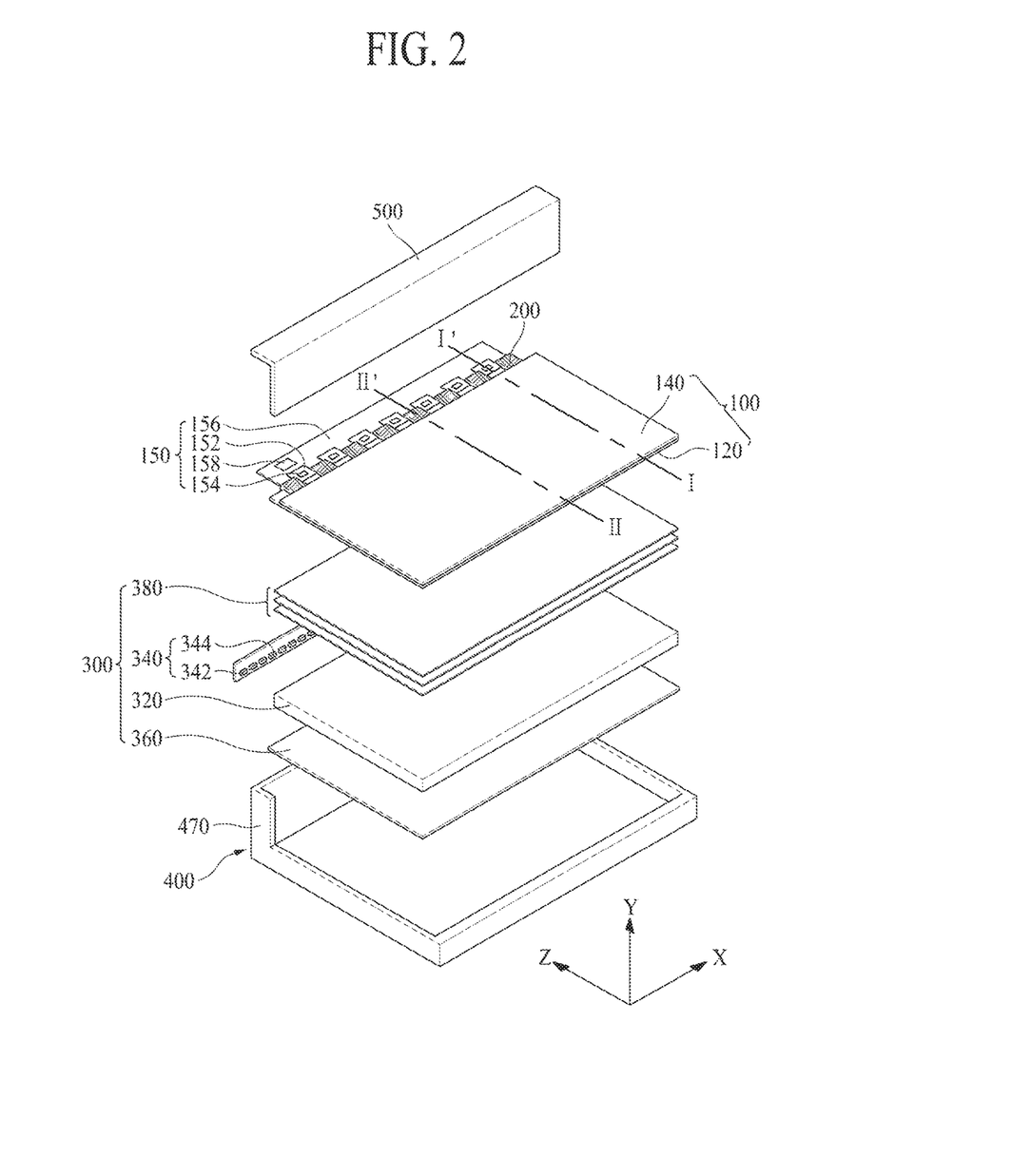
FIG. 2 is an exploded perspective view of the LCD device illustrated in FIG. 1.
Figure 3:
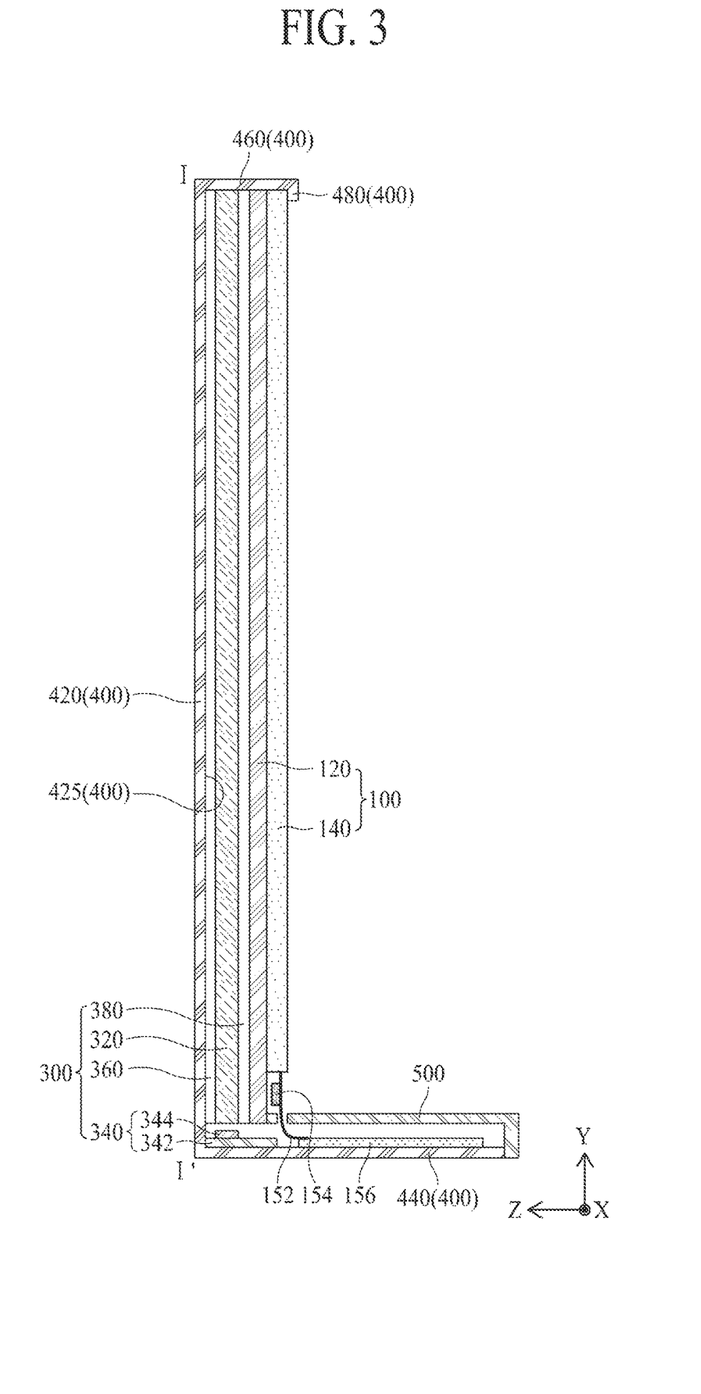
FIG. 3 is a cross-sectional view taken along line I-I' of FIG. 2.
Figure 4:
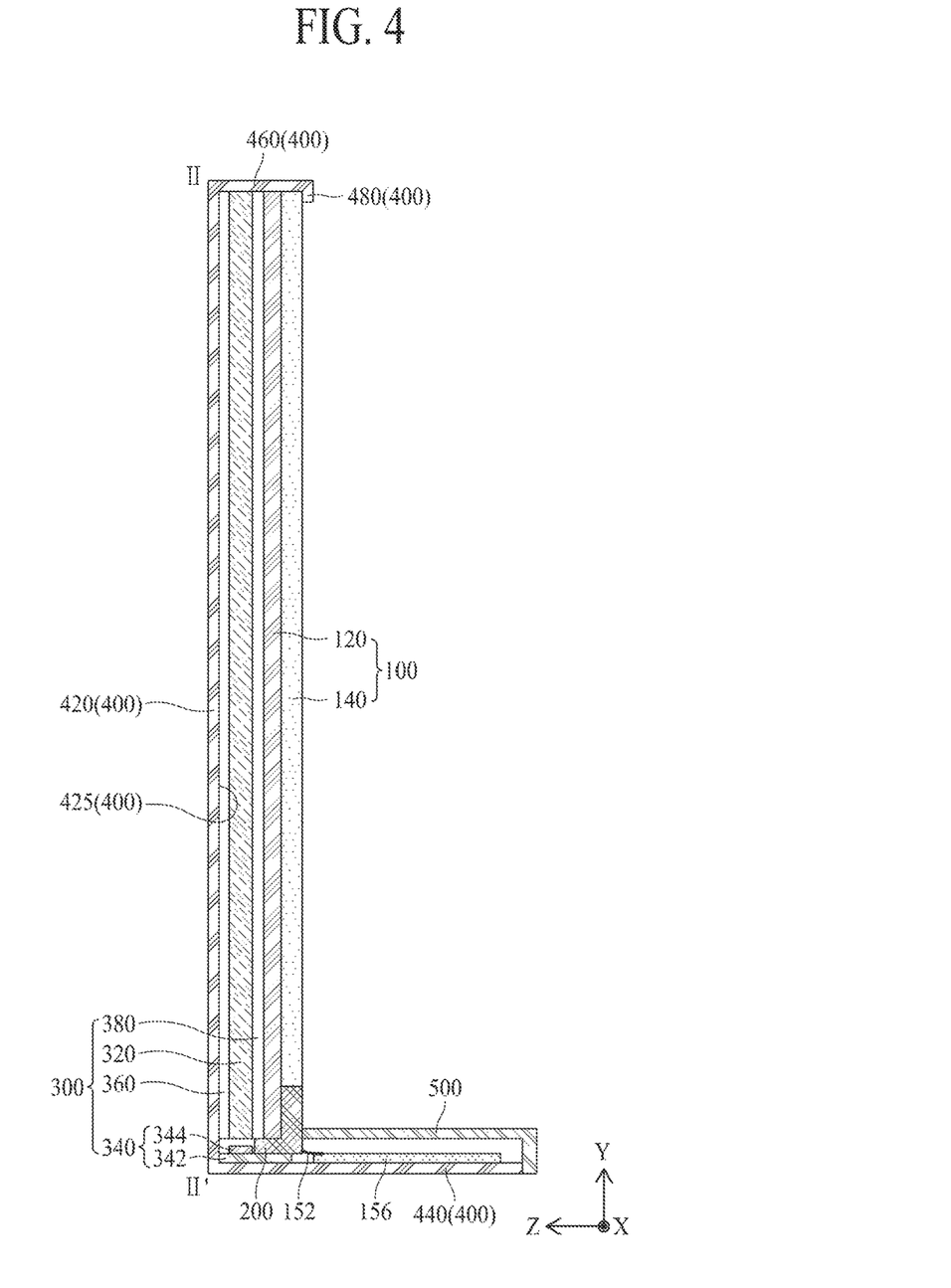
FIG. 4 is a cross-sectional view taken along line II-II' of FIG. 2.

FIG. 1 is a perspective view illustrating an LCD device according to an embodiment of the present invention. FIG. 2 is an exploded perspective view of the LCD device illustrated in FIG. 1. FIG. 3 is a cross-sectional view taken along line I-I' of FIG. 2. FIG. 4 is a cross-sectional view taken along line II-II' of FIG. 2.

Referring to FIGS. 1 to 4, the LCD device according to an embodiment of the present invention may include a liquid crystal display panel 100, a panel driver 150, a supporting member 200, a backlight unit 300, an upright-type case member 400, and a cover member 500.

The liquid crystal display panel 100 may adjust a light transmittance of a liquid crystal layer (not shown) to display an image and may include a lower substrate 120 and an upper substrate 140 which are oppositely bonded to each other with the liquid crystal layer therebetween, a lower polarization member, and an upper polarization member. The liquid crystal display panel 100 may drive the liquid crystal layer with an electric field which is generated in each of a plurality of pixels by a data voltage and a common voltage applied to each pixel, thereby displaying a color image according to the light transmittance of the liquid crystal layer.

The panel driver 150 may be connected to a pad part provided on the lower substrate 120 to drive each of the pixels of the liquid crystal display panel 100, thereby displaying a color image on the liquid crystal display panel 100. The panel driver 150 according to an embodiment may include a plurality of flexible circuit films 152 connected to the pad part of the liquid crystal display panel 100, a data driving integrated circuit (IC) 154 mounted on each of the plurality of flexible circuit films 152, a printed circuit board (PCB) 156 coupled to each of the plurality of flexible circuit films 152, and a timing controller 158 mounted on the PCB 156.

Each of the flexible circuit films 152 may be attached between the pad part of the lower substrate 120 and the PCB 156 through a film attach process and may be a tape carrier package (TCP) or a chip-on film (COF, chip-on flexible board).

The data driving IC 154 may be mounted on each of the plurality of flexible circuit films 152 and may be connected to the pad part through a corresponding flexible circuit film 152. The data driver IC 154 may receive pixel data for each pixel and a data control signal which are supplied from the timing controller 158, and may convert the pixel data for each pixel according to the data control signal into an analog data signal to supply the analog data signal to a corresponding data line through the pad part.

The PCB 156 may be connected to the liquid crystal display panel 100 through the plurality of flexible circuit films 152 and may be disposed in a horizontal supporting part of the below-described upright-type case member 400. In this case, the PCB 156 may be disposed to protrude to a front surface of the liquid crystal display panel 100 by the flexible circuit films 152, and thus, a thickness of the LCD device does not increase. The PCB 156 protruding to the front surface of the liquid crystal display panel 100 may be covered by the below-described cover member 500. The PCB 156 may supply signals, which are necessary for displaying an image on each pixel of the liquid crystal display panel 100, to the data driving IC 154 and a gate driving circuit. To this end, various signal lines, various power circuits (not shown), and a memory device (not shown) may be mounted on the PCB 156.

The timing controller 158 may be mounted on the PCB 156. In response to a timing synchronization signal supplied from an external driving system (not shown), the timing controller 158 may align digital video data input from the external driving system according to a pixel arrangement structure of the liquid crystal display panel 100 to generate pixel data for each pixel and may supply the generated pixel data for each pixel to the data driving IC 154. Also, the timing controller 158 may generate a data control signal and a gate control signal based on the timing synchronization signal to control a driving timing of each of the data driving IC 154 and the gate driving circuit.

In addition, the timing controller 158 may control the backlight unit 300 by using edge-type local diming technology, thereby individually controlling luminance of each area of the liquid crystal display panel 100.

The supporting member 200 may be disposed in a horizontal supporting part 440 of the below-described upright-type case member 400 and may support an optical sheet part 380 and the liquid crystal display panel 100. The supporting member 200 may support a load of each of the liquid crystal display panel 100 and the optical sheet part 380 which are vertically disposed by the upright-type case member 400. Therefore, in the LCD device according to an embodiment of the present invention, the supporting member 200 may be disposed in the horizontal supporting part 440 of the upright-type case member 400, thereby preventing the liquid crystal display panel 100 and the optical sheet part 380 from being separated from the upright-type case member 400. Also, in the LCD device according to an embodiment of the present invention, the supporting member 200 may be disposed on a side surface of each of the liquid crystal display panel 100 and the optical sheet part 380, and thus, a thickness of the LCD device does not increase.

The backlight unit 300 may be accommodated into the below-described upright-type case member 400. In more detail, the backlight unit 300 may be attached on a supporting surface 425 of the upright-type case member 400 to irradiate light onto a bottom of the liquid crystal display panel 100. Therefore, the liquid crystal display panel 100 may be disposed on the backlight unit 300. In this case, the backlight unit 300 may be directly attached on a rear surface of the liquid crystal display panel 100. Therefore, in the LCD device according to an embodiment of the present invention, the liquid crystal display panel 100 may be directly disposed on the backlight unit 300 without a separate element for enabling the liquid crystal display panel 100 to be stably disposed on the backlight 300, and thus, a thickness of the LCD device does not increase. The backlight unit 300 according to an embodiment may include a light guide plate 320, a light emitting diode (LED) array 340, a reflective sheet 360, and the optical sheet part 380.

The light guide plate 320 may include a light incident surface which is disposed under the rear surface of the liquid crystal display panel 100 and includes one side on which the light is incident. A front surface of the light guide plate 320 may be attached on the optical sheet part 380, and a rear surface of the light guide plate 320 may be attached on the reflective sheet 360.

The LED array 340 may irradiate the light onto the light incident surface provided on one surface of the light guide plate 320. The LED array 340 according to an embodiment may include a plurality of light source modules 344 which are mounted on an array board 342 and emit white light according to a light source driving signal from a backlight driver (not shown).

The plurality of light source modules 344 may face the light incident surface of the light guide plate 320, may be mounted on the array board 342, and may be arranged at certain intervals along the light guide plate 320. The light source modules 344 may be disposed between the horizontal supporting part 440 of the upright-type case member 400 and the light guide plate 320 and may irradiate the light onto the light incident surface provided on the one surface of the light guide plate 320. The light source modules 344 according to an embodiment may be mounted on the array board 342 and may emit the white light according to the light source driving signal from the backlight driver (not shown).

The reflective sheet 360 may be disposed on a bottom of the light guide plate 320 to reflect the light, which incident from the light guide plate 320, to the light guide plate 320, thereby minimizing the loss of the light traveling to the rear surface of the light guide plate 320. In this case, a front surface of the reflective sheet 360 may be attached on the rear surface of the light guide plate 320, and a rear surface of the reflective sheet 360 may be attached on the supporting surface 425 of the upright-type case member 400.

The optical sheet part 380 may be disposed on the light guide plate 320 and may include a lower diffusive sheet, a prism sheet, and an upper diffusive sheet, but is not limited thereto. In other embodiments, the optical sheet part 380 may be configured by a stacked combination of two or more sheets selected from among a diffusive sheet, a prism sheet, a dual brightness enhancement film, and a lenticular sheet. A rear surface of the optical sheet part 380 may be attached on the light guide plate 320.

The upright-type case member 400 may accommodate the liquid crystal display panel 100 and the backlight unit 300 which are attached on the supporting surface 425. Also, the upright-type case member 400 may be bent from one edge of the supporting surface 425 and may protrude to the front surface of the liquid crystal display panel 100 to stably support the liquid crystal display panel 100, thereby making the LCD device stand without a separate element. The upright-type case member 400 may include a vertical supporting part 420, a horizontal supporting part 440, a semi-horizontal supporting part 460, a side wall 470, and a ring part 480.

The vertical supporting part 420 may include the supporting surface 425, and the backlight unit 300 may be attached on the supporting surface 425. In this case, a rear surface of the vertical supporting part 420 opposite to the supporting surface 425 may be planar. Accordingly, in the LCD device according to an embodiment, a thickness does not increase, and an aesthetic appearance is enhanced.

The horizontal supporting part 440 may be bent from one edge of the vertical supporting part 420 to support the PCB 156 and the LED array 340. The horizontal supporting part 440 may protrude to the front surface of the liquid crystal display panel 100, and thus, when the liquid crystal display panel 100 stands, the horizontal supporting part 440 stably supports the liquid crystal display panel 100. In this case, the horizontal supporting part 440 may protrude by a length of the PCB 156, for supporting the PCB 156.

The semi-horizontal supporting part 460 may be bent from the other edge of the vertical supporting part 420 and may be disposed in parallel with the horizontal supporting part 440. The semi-horizontal supporting part 460 may support one side of each of the backlight unit 300 and the liquid crystal display panel 100. In this case, the horizontal supporting part 440 parallel to the semi-horizontal supporting part 460 may be provided longer than the semi-horizontal supporting part 460 and may protrude to the front surface of the liquid crystal display panel 100. Accordingly, according to an embodiment of the present invention, when the LCD device stands, the horizontal supporting part 440 supporting a lower portion of the LCD device may be provided longer than the semi-horizontal supporting part 460, and thus, the LCD device is stably supported without a separate element.

The side wall 470 may be bent from both edges other than one side and the other side of the vertical supporting part 420 and may extend to both sides of the horizontal supporting part 440. The side wall 470 may cover a side surface of the PCB 156 disposed on the horizontal supporting part 440. Accordingly, despite that the PCB 156 protrudes to the front surface of the liquid crystal display panel 100, the LCD device according to an embodiment of the present invention is not exposed to the outside.

The ring part 480 may be bent from one edge of the semi-horizontal supporting part 460 and may be disposed in parallel with the vertical supporting part 420. The ring part 480 may support a front border of the liquid crystal display panel 100, thereby stably supporting the liquid crystal display panel 100 so as not to be separated from the front surface In the LCD device according to an embodiment of the present invention, the horizontal supporting part 440 of the upright-type case member 400 may make the LCD device stand without a separate element. Also, since the backlight unit 300 is attached on the vertical supporting part 420 of the upright-type case member 400, the backlight unit 300 may be fixed without a separate element. In the LCD device according to another embodiment of the present invention, by using the upright-type case member 400, an aesthetic appearance is enhanced without any increase in thickness of the LCD device, and a separate element is omitted, thereby reducing the manufacturing cost.

The cover member 500 may be coupled to the horizontal supporting part 440 of the upright-type case member 400 to cover the PCB 156. Therefore, in the LCD device according to an embodiment of the present invention, the cover member 500 may be disposed on the PCB 156, and thus, despite that the PCB 156 protrudes to the front surface of the liquid crystal display panel 100, the LCD device is not exposed to the outside. In this case, the cover member 500 may include a touch sensor. The touch sensor may be one of an add-on type, where a display device and a touch panel including the touch sensor are individually manufactured and then the touch panel is attached on a top of the cover member 500, and an on-cell type where the touch sensor is directly provided on a surface of the cover member 500. The touch sensor enables a user to simply manipulate the liquid crystal display panel 100.

In the LCD device according to an embodiment of the present invention, since the backlight unit 300 is directly attached on the liquid crystal display panel 100, a separate element for enabling the liquid crystal display panel 100 to be stably disposed on the backlight unit 300 is not provided, and thus, a thickness of the LCD device does not increase. Also, in the LCD device according to an embodiment of the present invention, the horizontal supporting part 440 of the upright-type case member 400 may make the LCD device stand without a separate element. Also, in the LCD device according to an embodiment of the present invention, since the backlight unit 300 is attached on the vertical supporting part 420 of the upright-type case member 400, the backlight unit 300 may be fixed without a separate element. Also, in the LCD device according to an embodiment of the present invention, by using the upright-type case member 400, an aesthetic appearance is enhanced without any increase in thickness of the LCD device, and a separate element is omitted, thereby reducing the manufacturing cost.

Figure 5:
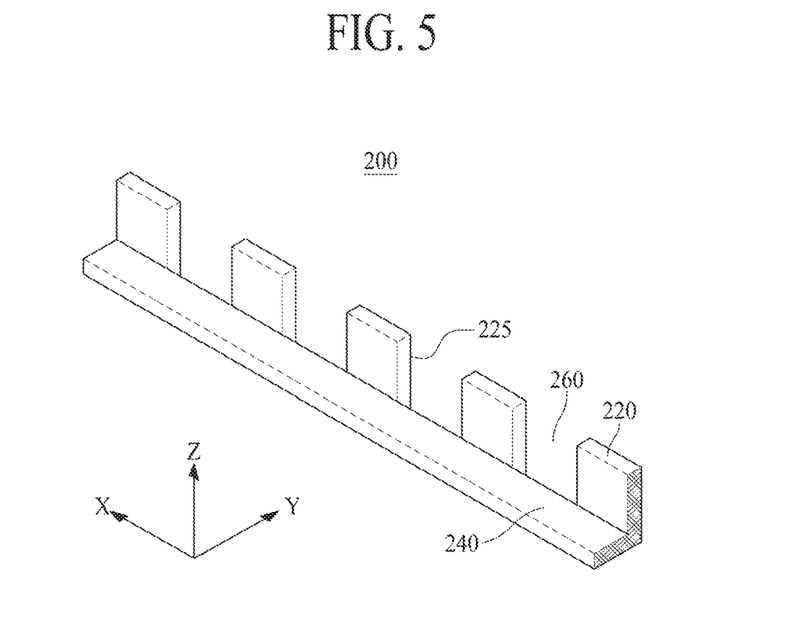
FIG. 5 is a perspective view illustrating a supporting member according to an embodiment of the present invention.
Figure 6:
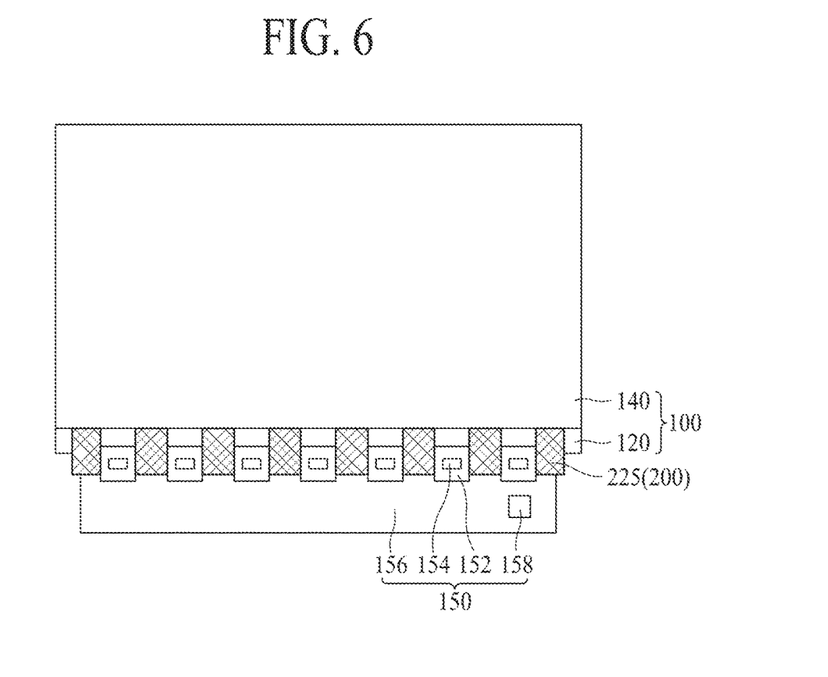
FIG. 6 is a plan view illustrating an example where a supporting member according to an embodiment of the present invention is disposed between flexible circuit films.

FIG. 5 is a perspective view illustrating a supporting member according to an embodiment of the present invention, and FIG. 6 is a plan view illustrating an example where a supporting member according to an embodiment of the present invention is disposed between flexible circuit films. FIGS. 5 and 6 are the drawings for describing in detail the supporting member 200 of the LCD device according to an embodiment illustrated in FIGS. 1 to 4. Hereinafter, therefore, only the supporting member 200 will be described, and repetitive descriptions on the same elements are not repeated.

Referring to FIGS. 5 and 6, the supporting member 200 may include a panel supporting part 220, a sheet supporting part 240, and a flexible circuit film mounting part 260.

The panel supporting part 220 may face one surface of the liquid crystal display panel 100 and may support a side surface of the liquid crystal display panel 100.

The sheet supporting part 240 may be vertically bent from the panel supporting part 220, may face one surface of the optical sheet part 380, and may support the optical sheet part 380.

The flexible circuit film mounting part 260 may be a groove which is provided so that each of the flexible circuit films 152 passes through a gap between adjacent panel supporting parts 220 included in the supporting member 200 and is connected to the liquid crystal display panel 100.

The supporting member 200 may support a load of each of the liquid crystal display panel 100 and the optical sheet part 380 which are vertically disposed by the upright-type case member 400. Therefore, in the LCD device according to an embodiment of the present invention, the supporting member 200 may be disposed in the horizontal supporting part 440 of the upright-type case member 400, thereby preventing the liquid crystal display panel 100 and the optical sheet part 380 from being separated from the upright-type case member 400. Also, in the LCD device according to an embodiment of the present invention, the supporting member 200 may be disposed on a side surface of each of the liquid crystal display panel 100 and the optical sheet part 380, and thus, a thickness of the LCD device does not increase.

In the supporting member 200 illustrated in FIG. 5, a plurality of the panel supporting parts 220 may be connected as one by the sheet supporting part 240, but each of the panel supporting parts 240 may be individually provided. Also, in the supporting member 200 illustrated in FIGS. 5 and 6, the panel supporting parts 220 may be arranged at certain intervals, but an interval and a size may be modified based on an arrangement interval between the flexible circuit films 152. For example, if the flexible circuit film 152 is not provided in plurality and is provided as one, the panel supporting part 220 may be disposed on each of both sides of the flexible circuit film 152.

Figure 7:
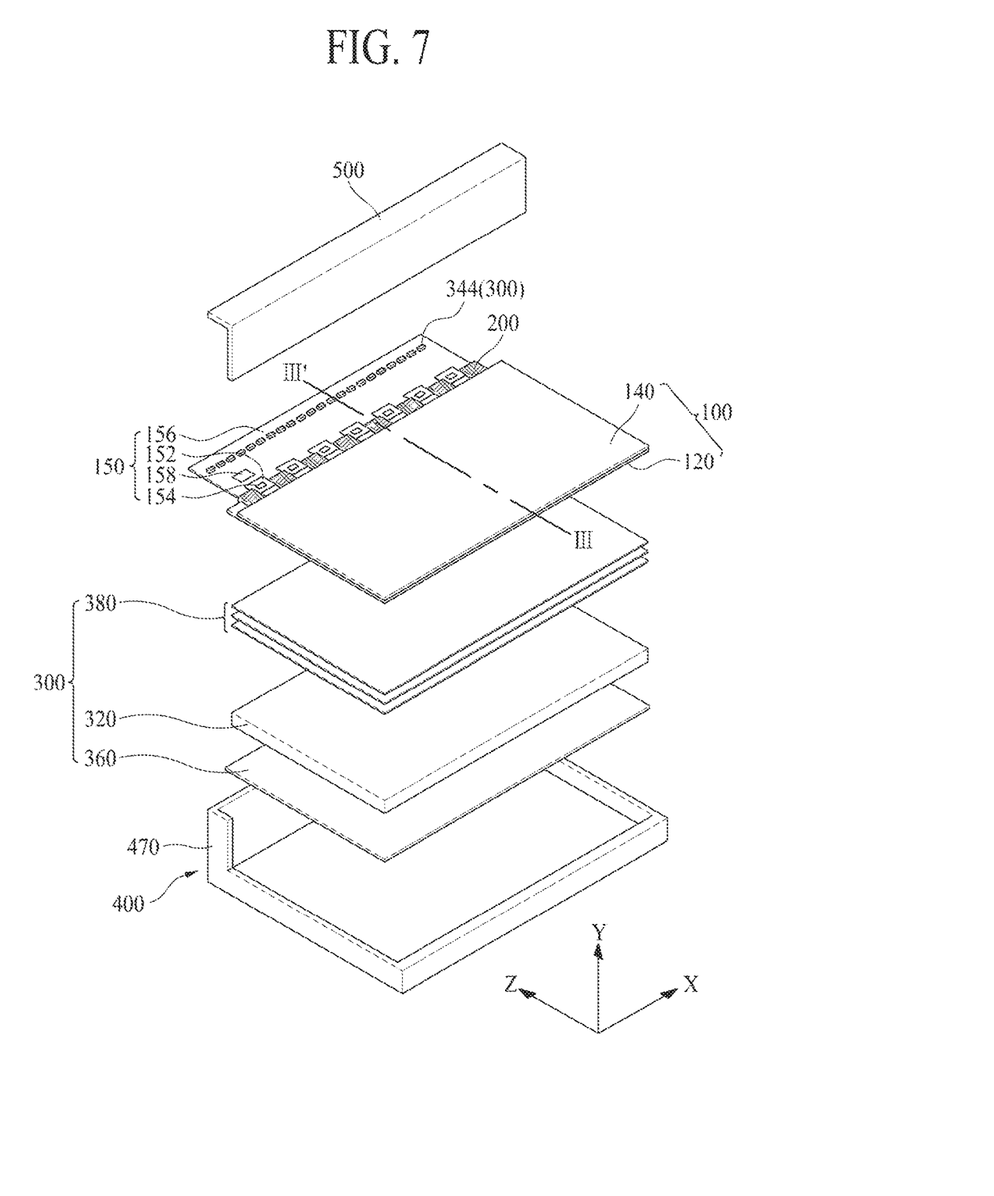
FIG. 7 is an exploded perspective view illustrating an LCD device according to another embodiment of the present invention.
Figure 8:
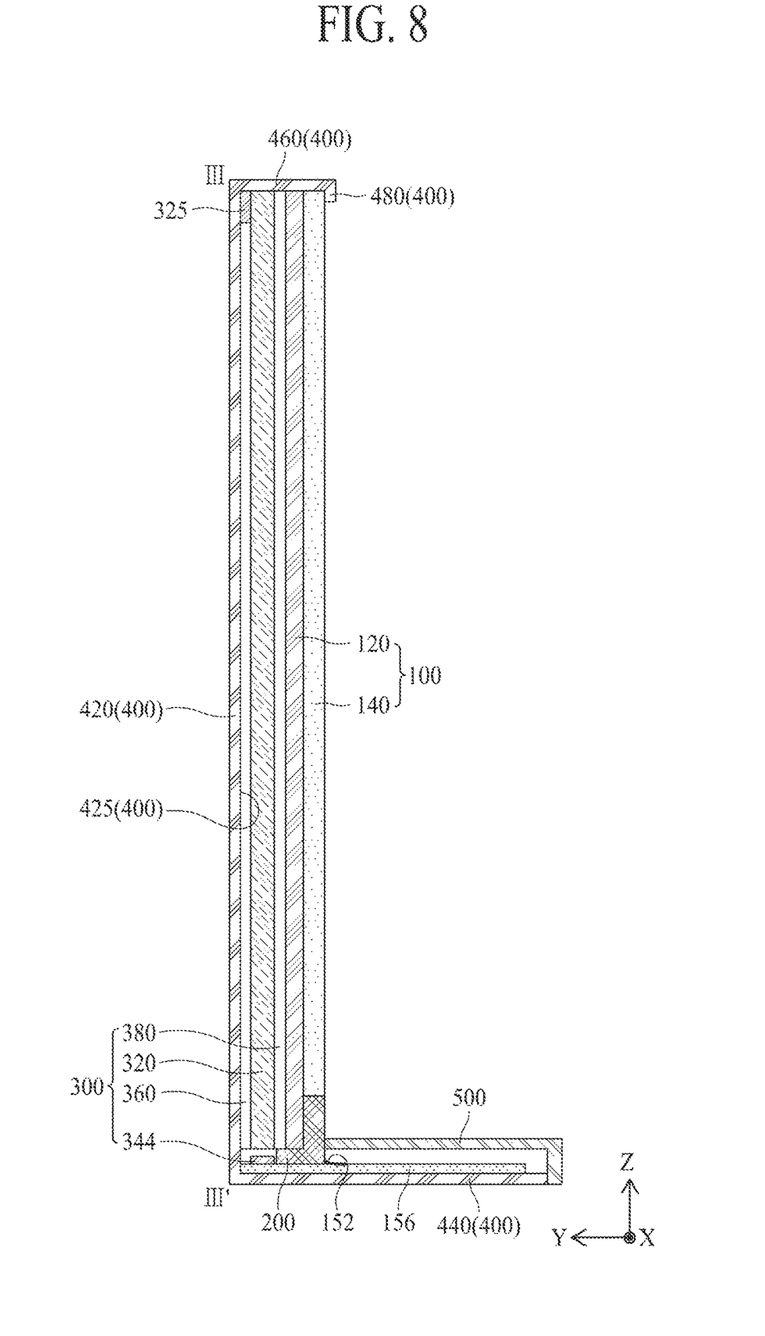
FIG. 8 is a cross-sectional view taken along line III-III' of FIG. 7.

FIG. 7 is an exploded perspective view illustrating an LCD device according to another embodiment of the present invention, and FIG. 8 is a cross-sectional view taken along line III-III' of FIG. 7. The LCD device according to another embodiment of the present invention is the same as the LCD device according to an embodiment illustrated in FIGS. 1 to 4, except for a PCB 156, an adhesive member 325, and a light source module 344. Hereinafter, therefore, the PCB 156, only the adhesive member 325, and the light source module 344 will be described, and repetitive descriptions on the same elements are not repeated.

Referring to FIGS. 7 and 8, the PCB 156 may be connected to a liquid crystal display panel 100 through a plurality of flexible circuit films 152 and may be disposed in a horizontal supporting part 440 of an upright-type case member 400 to be described below. The PCB 156 according to an embodiment may be disposed vertical to the liquid crystal display panel 100 and may protrude to a front surface and a rear surface of the liquid crystal display panel 100. In this case, one side of the PCB 156 may be disposed to protrude to the front surface of the liquid crystal display panel 100 and may be covered by the below-described cover member 500. The PCB 156 may supply signals, which are necessary for displaying an image on each pixel of the liquid crystal display panel 100, to a data driving IC 154 and a gate driving circuit. To this end, various signal lines, various power circuits (not shown), and a memory device (not shown) may be mounted on the PCB 156. Also, the other side of the PCB 156 may protrude to the rear surface of the liquid crystal display panel 100 and may overlap one surface of a backlight unit 300. In this case, the PCB 156 may overlap a light guide plate 320 of the backlight unit 300. The light source module 344 may be mounted on the PCB 156 overlapping the light guide plate 320.

The LCD device according to another embodiment of the present invention, the various signal lines, the various power circuits (not shown), and the memory device (not shown) for driving the liquid crystal display panel 100 may be mounted on one side of the PCB 156, and the light source module 344 may be mounted on the other side of the PCB 156. Therefore, in the LCD device according to another embodiment of the present invention, the light source module 344 may be mounted on the PCB 156 without a separate array for mounting the light source module 344, and thus, a thickness of the LCD device does not increase, thereby enhancing an aesthetic appearance of the LCD device.

The adhesive member 325 may be disposed between a rear surface of the light guide plate 320 and a vertical supporting part 420 of an upright-type case member 400. In more detail, the adhesive member 325 may be in a corner where the vertical supporting part 420 of the upright-type case member 400 meets a semi-horizontal supporting part 460 of the upright-type case member 400. The adhesive member 325 may fix the light guide plate 320 to the upright-type case member 400, thereby preventing the light guide plate 320 from being separated from the upright-type case member 400.

The light source module 344 may be disposed between the horizontal supporting part 440 of the upright-type case member 400 and the light guide plate 320 and may irradiate light onto a light incident surface provided on one surface of the light guide plate 320. The light source module 344 according to an embodiment may be mounted on the PCB 156 and may emit white light according to a light source driving signal from a backlight driver (not shown). The light source module 344 may be provided in plurality. The plurality of light source modules 344 may face the light incident surface of the light guide plate 320, may be mounted on the PCB 156, and may be arranged at certain intervals along the light guide plate 320.

In the LCD device according to another embodiment of the present invention, since the backlight unit 300 is directly attached on the liquid crystal display panel 100, a separate element for enabling the liquid crystal display panel 100 to be stably disposed on the backlight unit 300 is not provided, and thus, a thickness of the LCD device does not increase. Also, in the LCD device according to another embodiment of the present invention, the horizontal supporting part 440 of the upright-type case member 400 may make the LCD device stand without a separate element. Also, in the LCD device according to another embodiment of the present invention, since the backlight unit 300 is attached on the vertical supporting part 420 of the upright-type case member 400, the backlight unit 300 may be fixed without a separate element. Also, in the LCD device according to another embodiment of the present invention, by using the upright-type case member 400, an aesthetic appearance is enhanced without any increase in thickness of the LCD device, and a separate element is omitted, thereby reducing the manufacturing cost.

According to the embodiments of the present invention, since the liquid crystal display panel is directly attached on the backlight unit, a separate element for enabling the liquid crystal display panel to be stably disposed on the backlight unit is not needed, and thus, a thickness of the LCD device does not increase.

Moreover, according to the embodiments of the present invention, the horizontal supporting part of the upright-type case member may make the LCD device stand without a separate element.

Moreover, in the LCD device according to an embodiment of the present invention, since the backlight unit is attached on the vertical supporting part of the upright-type case member, the backlight unit may be fixed without a separate element. Also, in the LCD device according to another embodiment of the present invention, by using the upright-type case member, an aesthetic appearance is enhanced without any increase in thickness of the LCD device, and a separate element is omitted, thereby reducing the manufacturing cost.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device, comprising:
   an upright-type case member including a supporting surface;
   a backlight unit attached on the supporting surface; and
   a liquid crystal display panel directly attached on the backlight unit,
   wherein the upright-type case member is bent from one edge of the supporting surface and protrudes to a front surface of the liquid crystal display panel.

2. The LCD device of claim 1, wherein
   the upright-type case member comprises:
   a vertical supporting part including the supporting surface on which the backlight unit is attached;
   a horizontal supporting part bent from one edge of the vertical supporting part;
   a semi-horizontal supporting part bent from another edge of the vertical supporting part and disposed in parallel with the horizontal supporting part; and
   a side wall bent from both edges other than one side and another side of the vertical supporting part, the side wall extending to both surfaces of the horizontal supporting part, and
   the horizontal supporting part is longer in length than the semi-horizontal supporting part.

3. The LCD device of claim 2, further comprising: a ring part bent from one edge of the semi-horizontal supporting part and disposed in parallel with the vertical supporting part to support a front border of the liquid crystal display panel.

4. The LCD device of claim 2, further comprising:
   a printed circuit board (PCB) connected to the liquid crystal display panel and supported by the horizontal supporting part to protrude to the front surface of the liquid crystal display panel; and
   a cover member coupled to the horizontal supporting part to cover the PCB.

5. The LCD device of claim 4, wherein the PCB is disposed vertical to the liquid crystal display panel and protrudes to the front surface and a rear surface of the liquid crystal display panel.

6. The LCD device of claim 4, wherein the backlight unit comprises:
   a reflective sheet attached on the supporting surface;
   a light guide plate attached on the reflective sheet;
   an optical sheet part attached on the light guide plate; and
   a light source module disposed between the horizontal supporting part and the light guide plate.

7. The LCD device of claim 6, further comprising: a supporting member disposed in the horizontal supporting part to support the optical sheet part and the liquid crystal display panel.

8. The LCD device of claim 7, further comprising: a flexible circuit film connecting the liquid crystal display panel to the PCB,
   wherein the supporting member comprises:
   a panel supporting part supporting a side surface of the liquid crystal display panel;
   a sheet supporting part vertically bent from the panel supporting part to support the optical sheet part; and
   a flexible circuit film mounting part, the flexible circuit film mounting part being a groove for providing the flexible circuit film.

9. The LCD device of claim 5, further comprising: a light source module mounted on the PCB and disposed between the horizontal supporting part and the light guide plate.

10. The LCD device of claim 4, wherein the cover member comprises a touch sensor.

11. The LCD device of claim 6, further comprising: an adhesive member attaching the light guide plate on the semi-horizontal supporting part of the upright-type case member.

* * * * *